United States Patent
Palmer

[15] 3,650,837
[45] Mar. 21, 1972

[54] SECONDARY METAL/AIR CELL

[72] Inventor: Nigel J. Palmer, Port Washington, N.Y.

[73] Assignee: Leesona Corporation, Warwick, R.I.

[22] Filed: Apr. 6, 1970

[21] Appl. No.: 25,883

[52] U.S. Cl. .......................................................... 136/86 A
[51] Int. Cl. ............................................................ H01m 29/02
[58] Field of Search ....................................... 136/86, 120 FC

[56] References Cited

UNITED STATES PATENTS

| | | | |
|---|---|---|---|
| 2,597,119 | 5/1952 | Schumacher et al. | 136/111 |
| 3,276,909 | 10/1966 | Moos | 136/86 |
| 3,407,096 | 10/1968 | Landi | 136/86 |
| 3,513,029 | 5/1970 | Giner et al. | 136/86 |

Primary Examiner—Winston A. Douglas
Assistant Examiner—H. A. Feeley
Attorney—Brufsky, Staas, Breiner and Halsey

[57] ABSTRACT

An electrically rechargeable metal/air or metal/oxygen depolarized electrochemical cell and a method of generating electricity therefrom are described. The electrochemical cell comprises an anode capable of being regenerated and a composite cathode having an oxygen-permeable, hydrophobic member layered with catalyst and a bi-porous unit. The coarse pore layer of the bi-porous unit is in contact with the catalyst. A bubble barrier which can be integral with either the anode or composite cathode is in contact with the fine pore layer of the bi-porous unit. During discharge of the cell, the bi-porous unit is flooded with electrolyte and merely acts as a current collector. When charging, oxygen evolution occurs at the fine pore layer and, due to the bubble barrier, the evolved oxygen is forced into the coarse pore layer displacing the electrolyte, thereby protecting the catalyst layer from damage due to oxygen evolution and the high charging potential.

13 Claims, 4 Drawing Figures

Patented March 21, 1972

INVENTOR,
NIGEL I. PALMER

SECONDARY METAL/AIR CELL

FIELD OF INVENTION AND PRIOR ART

This invention relates to rechargeable or secondary batteries. More specifically, the invention relates to metal/air or metal/oxygen depolarized electrochemical cells comprising a regenerable metal anode and a composite cathode having a hydrophobic member, a catalyst layered on said member, and a bi-porous unit. The composite cathode is constructed and arranged whereby the bi-porous unit functions as a current collector during discharge and as a recharging electrode during charging, thereby protecting the catalyst layer of the electrode.

In recent years demand for lightweight reliable power sources with increased energy densities has intensified for both military and civilian programs. To fill this need, considerable attention and effort has been focused on the metal/air battery system and particularly the zinc/air primary system which has been successfully used for a number of years in applications requiring long life and reliability such as railway signaling and the like. More recently, zinc/air systems including mechanically rechargeable systems have been developed which satisfy the necessary high energy requirements needed in modern equipment such as radio transceivers. Reference is made to the cells described in commonly assigned U.S. Pat. Nos. 3,378,406 to Rosansky; 3,436,270 to Oswin et al.; and 3,468,711 to Jagid et al. However, efforts to apply existing primary, including mechanically rechargeable metal/air cell technology directly to the secondary or electrically rechargeable system, has met with only limited success.

Investigations were directed at determining causative relationships resulting in shortened cell life of secondary metal/air systems. The most significant factor noted detrimentally affecting the life of the cell was found to be the deterioration of the cathode member brought about by repeated discharge/recharge cycling. During the recharging portion of the cycle, the potential of the cell is increased causing oxygen to be evolved at the cathode-catalyst/electrolyte interface. The formed oxygen gas can disrupt the catalyst layer of the cathode, irreversibly damaging its operating capability. Additionally, the high potential or over-voltage of the catalyst can detrimentally corrode or oxidize the catalyst further impairing its operation. With each cycle, this effect becomes more apparent and in 15–20 cycles the cell may be virtually useless. This phenomenon was observed with a variety of different catalytic materials including precious metal catalysts and carbon.

One suggested approach to the shortened cell life problem utilizes a third or auxiliary electrode in lieu of the standard cathode for the purpose of recharging the cell. This third electrode, therefore, must be introduced into the circuitry prior to recharging and disconnected from the circuitry prior to discharging whereupon the standard electrodes, i.e., anode and cathode, are then reconnected. As will be appreciated, this system as a result of switching electrodes in the circuitry requires additional components (i.e., switches, etc.) and is, accordingly, costly and complex and increases the size of the battery.

OBJECTS AND GENERAL DESCRIPTION OF THE INVENTION

Accordingly, a primary object of the present invention is to provide an electrically rechargeable electrochemical cell of the air or oxygen depolarized type having only two electrodes.

Another object of the present invention is to provide a two-electrode cell which is reliable in use, economical in manufacture, and is long-lived, i.e., may be repeatedly charged and discharged without substantial fall-off in cell performance.

Still another object of the present invention is to provide a secondary cell of the metal/air type having a composite cathode including an air-permeable, hydrophobic membrane with a relatively inexpensive depolarizing catalytic material thereon.

A further object of the present invention is to provide a secondary cell of the metal/air type wherein the composite cathode includes a bi-porous unit in contact with the catalytic layer of the cathode, said bi-porous unit functioning as the current collector while discharging and the recharging electrode while charging.

Another object of the present invention is to provide versatile secondary battery combinations using appropriate numbers of air depolarized cells of the type described above.

These and other objects of the invention will become apparent from the following detailed description with particular emphasis being placed upon the drawing and preferred embodiments.

Broadly, the present invention embraces a two-electrode rechargeable metal/air system for generating direct current. The electrochemical cell employs an air depolarized composite cathode of the type comprising a hydrophobic polymer membrane layered with catalyst, a bi-porous unit with the coarse pore layer of this unit being in contact with the catalyst layer and a bubble barrier in contact with the fine pore layer of the bi-porous unit. During discharge the bi-porous unit functions as a current collector and upon recharge functions as a charging electrode providing a cell which can be repeatedly discharged and recharged without substantial reduction in cathode life and cell performance. This improved two-electrode cell in contrast with rechargeable metal/air cells having three or more electrodes is a simpler, more economical system having improved life and reliability. Additionally, the rechargeable metal/air cell of this invention offers significant improvements in economics, performance, and ease of operation in comparison to conventional metal/metal galvanic cells used in silver/zinc, lead/acid, and nickel/cadmium batteries. When these metal/metal galvanic cells are discharged by being placed under load and an electrical current drawn off, both anode and cathode chemically react and are changed in form. By reversing the polarity of the battery and applying an external potential, the cathode and anode members theoretically can be regenerated to their former chemical state, with the battery again being ready for operation. As commonly recognized, however, the aforesaid operation is inefficient, with the cells never being fully returned to their initial state. In contradistinction, in the system contemplated in this invention, only one of the electrodes i.e., the consumable metal electrode or anode, undergoes change during discharge and, accordingly, is the only electrode requiring regeneration.

The metal/air cells of the present invention can be constructed in various configurations including a bi-cell construction wherein the composite cathode is constructed and arranged in the shape of an envelope with the anode being interposed between the cathode walls. An electrolyte is maintained between the anode and cathode, preferably in a porous hydrophilic matrix or separator. The composite cathode comprises a gas-permeable, liquid-impermeable polymer member such as a polytetrafluoroethylene film. A layer of catalyst, preferably a relatively inexpensive material, is conventionally deposited on the inner surface of the membrane which contacts the electrolyte. A bi-porous unit is positioned next to the catalyst layer oriented in order that the very coarse pore layer is in contact with the catalyst and the fine pore layer is in the direction of the anode. A hydrophilic bubble barrier is in contact with the fine pore layer. The anode which may be of porous or solid construction is positioned within the envelope cathode and electrically separated from the cathode with an electrolytic solution which may be contained in a separator or matrix which also can function as the bubble barrier in contact with the fine pore layer. If so, the separator and anode must be pressed in contiguous contact with the fine pore layer. Sufficient electrolyte is employed in the separator to provide continuous ionic contact between the anode and cathode. This electrolyte will wet-out or contact the separator or matrix and bi-porous unit during discharge. During the recharge operation, however, the oxygen evolution at the fine pore layer, in view of the bubble barrier, will cause the electrolyte to be displaced from the coarse pore layer. Once the electrolyte is completely displaced from the coarse pore layer, this coarse pore layer as well as the catalyst layer, not being in contact with electrolyte, is effectively dissociated from the recharge operation. Accordingly, the present invention utilizes the breaking of electrolytic contact between the catalyst layer and the charging electrode, i.e., the fine pore layer; whereas in the above-mentioned prior art three-electrode system, the electronic contact between the catalyst layer and recharge electrode is broken by switching the air depolarized cathode out of the circuit. This invention avoids the need of switches and, further, makes effective use of the evolved oxygen, normally considered detrimental.

In addition to the bi-cell construction noted above, rechargeable cells of the present invention can be fabricated in the conventional cylindrical design of the so-called "D," "C," and "AA" batteries, or in a flat construction where only one cathode is positioned adjacent and electrically separated from the cathode. As in the bi-cell construction, the composite cathode will comprise a gas-permeable, hydrophobic polymer membrane having a catalyst layer on its inner surface and a bi-porous unit, the coarse pore layer being in contact with the catalyst and the fine pore layer being adjacent to and in contact with a bubble barrier. The anode is positioned within or adjacent the cathode.

During discharge an air-depolarized electrochemical cell of the present invention requires a continual supply of air or oxygen diffusing through the cathode. As the oxygen molecules emerge at the cathode catalyst, ionization of the molecules is promoted by the catalyst forming hydroxyl ions which transfer to the anode thereby completing the cathodic reaction. Where the anode is zinc and oxygen is the depolarizing agent, the overall cell electrochemical reaction during the discharge may be shown by the following equation:

(1) $$Zn + \frac{1}{2} O_2 \rightarrow ZnO$$

This overall reaction is obtained by adding the separate electrode reactions occurring during discharge which can be shown as follows:

At the cathode:

(2) $$\frac{1}{2} O_2 + H_2O + 2e \longrightarrow 2OH^-$$

At the anode:

(3) $$Zn + 2OH^- \longrightarrow ZnO + H_2O + 2e$$

It is noted that although the electrolyte does not take part in the overall cell reaction, hydroxyl ions are required to sustain the reaction. It may be necessary, therefore, to add water and/or electrolyte from time to time to make up for evaporative losses or the like.

As the cell discharges, the active anodic zinc is completely, or substantially completely, oxidized. At this point the discharge cycle may be said to be terminated and recharge is affected by regenerating the spent zinc anode. The overall cell electrochemical reaction during recharge may be described as being the reverse of Equation (1). To recharge the cell, an external power supply, e.g., regulated direct current, is attached to the electrode terminals. Almost immediately at the beginning of the recharge, oxygen evolves at the fine pore layer of the bi-porous unit. Since the bubble barrier prevents passage of the evolved oxygen into the electrolyte separating the cathode from the anode, it will displace the electrolyte from the coarse pore layer. In a very short time all of the electrolyte within the coarse pore layer is displaced, effectively dissociating the catalyst layer from any function during the charging part of the discharge/recharge cycle. In this manner only the bi-porous unit is subjected to the recharging currents and to the effects of oxygen evolution. It will be apparent, therefore, that a two-electrode cell of the type defined herein combines the advantages of three or more electrode systems, while obviating the disadvantages generally associated therewith.

THE DRAWING AND DETAILED DESCRIPTION OF THE INVENTION

The improved construction of the power source of the present invention will be more readily apparent from the accompanying drawing wherein like numerals are employed to designate like parts and wherein FIG. 1 is a broken-away, partial cross section of a metal/air cell according to the present invention;

Figure 1:
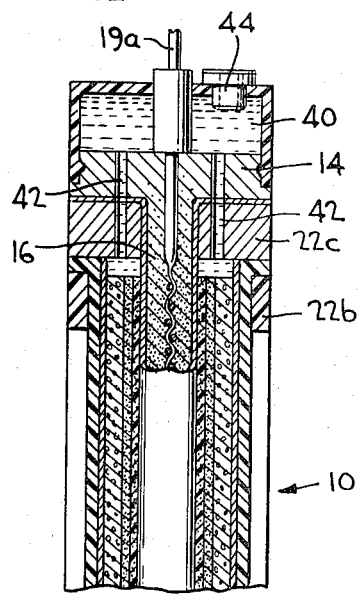

Referring to the drawing, the entire electrochemical cell is referred to generally by reference numeral 10. This cell comprises an envelope cathode having a U-shaped frame portion 22a, 22b, and 22c; and a composite laminar cathode 20. An anode 12 having a top portion 14 and a depending portion 16 is interposed between the walls of the envelope cathode. Conventional means well known in the art may be used for fixedly or removably sealing the under-portion of the anode flange or holder to the cathode frame. For example, if a permanent joint is desired, adhesives or the like may be applied to the upper edge 22c of the cathode frame, or mechanical clips or the like described in U.S. Pat. No. 3,436,270 may be used where removal of the anode is desired. As used in the present specification, the term anode and cathode apply to designated electrodes 12 and 20, respectively; irrespective of whether the cell is undergoing recharging or discharging. The laminar cathode as seen most clearly from FIG. 2 comprises a hydrophobic backing member 24, a catalyst layer 26, and a bi-porous unit 28. This bi-porous unit comprises a coarse pore layer 28a, and a fine pore layer 28b. As seen from the drawing, the coarse pore layer is adjacent to catalyst layer 26, whereas the fine pore layer is directed toward the anode of the cell. In the embodiment shown, a hydrophilic polymer bubble barrier 30 is interposed between the anode and the fine pore layer 28b. Additionally, anode 12 is wrapped in a separator 18. Normally, however, it is not essential to have the bubble barrier 30 if the anode is wrapped in a separator material and the bubble pressure or pore size of the material is such that it will act as a bubble barrier, i.e., prevent the passage of gaseous oxygen. It is recognized, however, that if the bubble barrier is a part of the anode, the anode and fine pore layer must be pressed together to have continuous contact. In the embodiment shown in FIG. 1 of the drawing, a reservoir 40 is positioned on top of the bi-cell and is in fluid communication with the electrolyte of the cell through passages 42. The reservoir has an opening 44 for adding electrolyte or water. The opening as shown is closed with a plug constructed with a one-way vent for the passage of gas which will permit oxygen evolved during charging to escape into the environment of the battery.

In operation, during discharge the electrochemical reaction of oxygen occurs at catalyst layer 26. The bi-porous unit 28, which is at the same potential as the catalyst layer, serves as a barrier-current collector between catalyst layer 26 and the anode 12. The entire unit is saturated with electrolyte. However, during the charging part of the cycle when a potential from an external source is applied to the battery, oxygen evolution will occur at the fine pore layer 28b. The hydrophilic matrix or separator 30 functions as a bubble barrier, preventing passage of oxygen into the electrolyte in the direction of the anode and, accordingly, forces the evolved oxygen into the highly porous layer 28a, displacing electrolyte from the layer. The electrolyte passes to the top of the cell, through channels 42 and into reservoir 40. This effectively removes electrolytic contact between catalyst layer 26 and fine pore layer 28b. Accordingly, although the same potential exists at catalyst layer 26 as in the rest of the composite cathode, the gas evolution and catalyst oxidation process occurs only in layer 28b. As a result, the catalyst is not damaged due to the high potential of oxygen evolution. Moreover, since the gas which is evolved passes upward and into the electrolyte, the catalyst layer is not damaged or disrupted by the evolved oxygen. It is possible, therefore, to employ less costly catalysts such as silver/mercury alloys in place of expensive catalysts such as platinum. Furthermore, since the oxygen gas bubbles are not released between the anode and cathode, charging efficiency is improved. More specifically, when gas bubbles are released between the electrodes into the electrolyte, the ionic path of electrons passing from electrode to electrode is longer in that the electrons cannot pass through the gas bubbles. In the absence of gas bubbles, the path is shortened, lowering the internal resistance.

Figure 4:
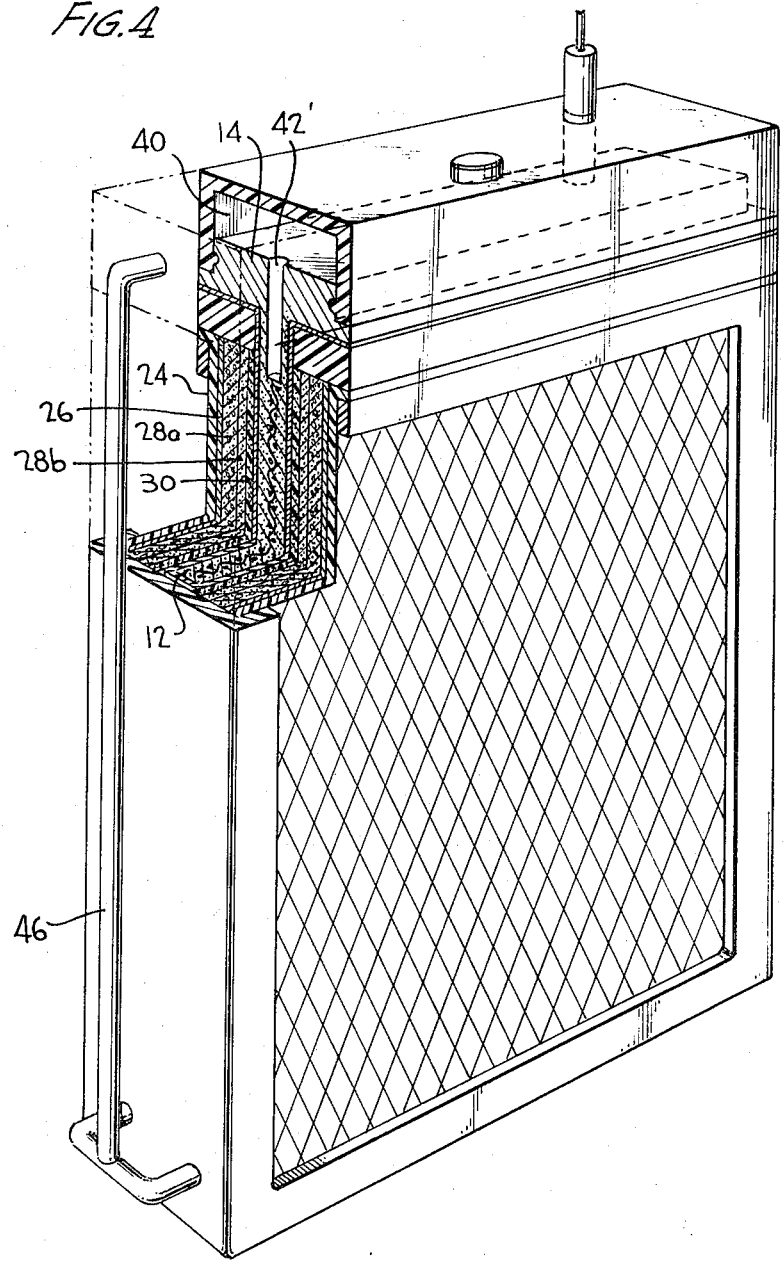
FIG. 4 is a perspective view partially broken-away of a second embodiment of the invention.

The embodiment of FIG. 4 is identical to the embodiment of FIG. 1 in all respects with the exception that the bi-porous unit is in communication with reservoir 40 of the cell through conduit 46 positioned at the side of the cell. According to the embodiment, electrolyte expelled from the coarse pore layers is removed from the bottom of the layers, carried by conduit 46 into reservoir 40 and returned to the cell through port 42' or a plurality of such ports which delivers the electrolyte into the anode. As will be appreciated, since less head pressure is exerted, the electrolyte is more quickly exhausted from the coarse pore layer.

Although the invention has been described and illustrated showing an integral bi-porous unit, it is possible to employ a bi-porous unit comprising two distinct layers. Moreover, as used herein, "coarse pore layer" embraces a structure having well-defined pores, as well as structures having openings as large as possible to permit entry of evolved oxygen gas and to permit rapid displacement of electrolyte. Accordingly, the coarse pore layer can be a layer of sintered particles, a porous mesh, or felt, as well as a plurality of vertical strips, or the like. Furthermore, although the cell as illustrated has a fine pore layer and a coarse pore layer both made of metal, it is possible to utilize a nonconductive porous ceramic or polymer as the coarse pore layer. In the event a nonconductive coarse pore layer is utilized, it is necessary that the fine pore layer be in electrical contact with the catalyst layer, for example by bonding the peripheries of the coarse and fine pore layers with a conductive material which is in contact with the catalyst layer of the composite cathode. Moreover, although it is not completely necessary, it is preferable that the fine pore layer have a lower over-potential for oxygen evolution than the catalyst layer. This will further ensure that oxygen evolution occurs at the fine pore layer and not at the catalyst layer. Materials which fulfill this requirement are nickel, lithiated nickel, cobalt/nickel spinels, and the like. Other materials which can be employed include oxidation-resistant materials such as titanium, tungsten, zirconium, and the like. Although there is no criticality with regard to the pore size of the coarse and fine pore layers, it is essential that the fine pore layer have a higher bubble pressure than the coarse pore layer. Additionally, it is essential that the bubble barrier which is utilized have a higher bubble pressure than the fine pore layer.

Figure 2:
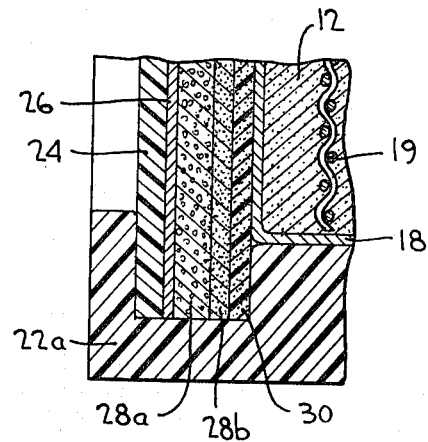
FIG. 2 is an enlarged cross-sectional view taken along lines 2—2 of FIG. 1.

Anode bodies 16 are preferably formed of porous metal having a porosity of from about 40 percent to about 85 percent. To further strengthen the body and improve its conductivity, a metal screen 19 shown most clearly in FIG. 2 is internally positioned within the anode terminating at an external electrical terminal 19a mounted in frame portion 14 of the anode. A nonconducting electrode separator 18 as noted above, preferably made of cellulose or porous plastic, is wrapped around and secured to the anode body substantially covering the surfaces normally exposed to the cathode. When the anode is porous, sufficient electrolyte is added to saturate the anode and the separator 18. In the event a solid metal anode is selected, the electrolyte may be added to the space between the walls of the envelope cathode and allowed to saturate the separator 18 and hydrophilic bubble barrier 30, or the separator may be saturated with electrolyte prior to the insertion. Suitable anode materials include metals, metalloids and alloys thereof. It is essential that the materials selected be chemically reactive with a compatible electrolyte and be more electropositive than oxygen. Further, it is essential that the material be electrochemically reversible in order for regeneration to take place. Such materials include lead, zinc, iron, and cadmium. From the standpoint of cost, capacity, and long life, zinc is the preferred material.

The nonconducting bubble barrier 30 must be hydrophilic and preferably is made of a cellulosic or porous plastic material. However, ceramic materials or light metals can also be selected. If a metal is selected, it is essential that the barrier be separated from the anode with a nonconductive separator. The bubble pressure of the barrier must be higher than that of the fine pore layer and be controlled to prevent passage about 15 to 85 percent and a uniform pore size distribution of from about 0.01 advantageous separator is an irradiated polyethylene membrane manufactured by General Electric. Of the cellulosic materials found useful, one type identified as Visking is sold by the Union Carbide & Chemical Corporation, New York, New York, and is especially preferred.

The hydrophobic polymer 24 utilized in composite cathode 20 can be any of the polymeric materials which are permeable to the passage of oxygen or oxygen-containing gases such as air, but are impermeable to liquids such as an aqueous electrolyte. Details of the basic cathode structure are also described in application U.S. Ser. No. 533,516 filed Mar. 11, 1966. Such polymers normally have a porosity of from about 0.01 to about 100 microns. Exemplary polymers are the fluorinated hydrocarbons such as polytetrafluoroethylene, polytrifluorochloroethylene, polyvinylidene-fluoride, the hydrophobic copolymers of two or more of the above materials or with acrylonitrile, methacrylate, or polyethylene. The essential requirement is that the polymer be sufficiently hydrophobic to preclude the passage of an aqueous medium, but still be sufficiently permeable to ambient oxygen to permit the requisite amount of gaseous oxidant to be transported to the catalytic surface. In view of its many desirable characteristics such as its hydrophobicity, resistance to variations in temperature, and its high corrosion resistance, polytetrafluoroethylene is the preferred polymer.

The thickness of the polymer membrane and/or the catalytic layer thereon is not critical. It is only essential that the polymer membrane be sufficiently thick to withstand the pressure and ancillary conditions of its ultimate environment. The catalytic layer can be relatively thick, but preferably is as thin as possible, primarily from the standpoint of economy. The ability to construct the composite cathode as an exceptionally thin unit contributes to the high energy to weight and energy to volume ratio obtained with the cells. Preferably, the hydrophobic polymer membrane will have a thickness of from about 0.5 to 10 mils, with the optimum range being from about 2 to 8 mils. The catalytic layer is kept as thin as possible for purposes of economy and is preferably from about 0.2 to 8 mils in thickness, with the optimum range being from about 0.5 to 2 mils.

The catalyst layer 26 is applied on the inner surface of the hydrophobic membrane 24 and provides the requisite oxygen electrolyte reaction interface. The catalyst used to coat the hydrophobic polymers are the pure elements, alloys, oxides, or mixtures thereof which are effective in promoting an electrochemical reaction with oxygen and which have a high over-potential for oxygen evolution. More specifically, operable materials include the elements belonging to Groups IB, IIB, IV, V, VI, VII, and VIII of the Mendelyeev's Periodic Table, as well as alloys, oxides, and mixtures of such elements. For example, suitable catalysts include the noble metals such as platinum, palladium, gold, and the like. However, since the catalyst layer employed in this invention is not subjected to the severe oxidizing effects normally present in conventional systems, a less expensive catalyst such as silver or alloys thereof and carbon may be utilized.

The cells will operate on conventional electrolytes including the alkaline materials such as sodium hydroxide, potassium hydroxide, mixtures of potassium and rubidium hydroxide and the like. Acid electrolytes including sulphuric acid, phosphoric acid, and hydrochloric acid may be employed. As is apparent, depending upon the particular electrolyte used, different anode materials can be selected. It is also feasible, and at times desirable, to employ an electrolyte which is trapped in a suitable matrix such as those made up of hydrophilic polymers, ceramic materials, and the like which will function as the bubble barrier.

Figure 3:
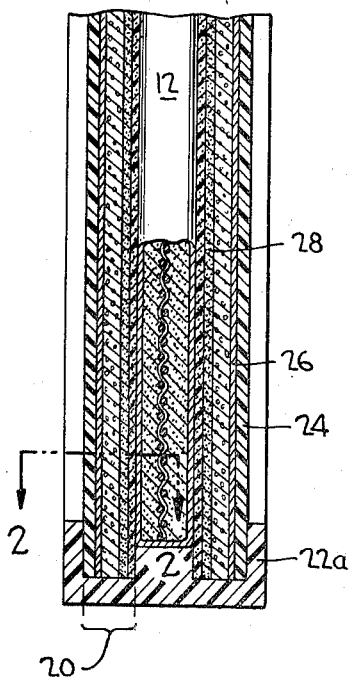
FIG. 3 is a perspective view of a battery comprising five cells of the type shown in FIG. 1.
Figure 3:
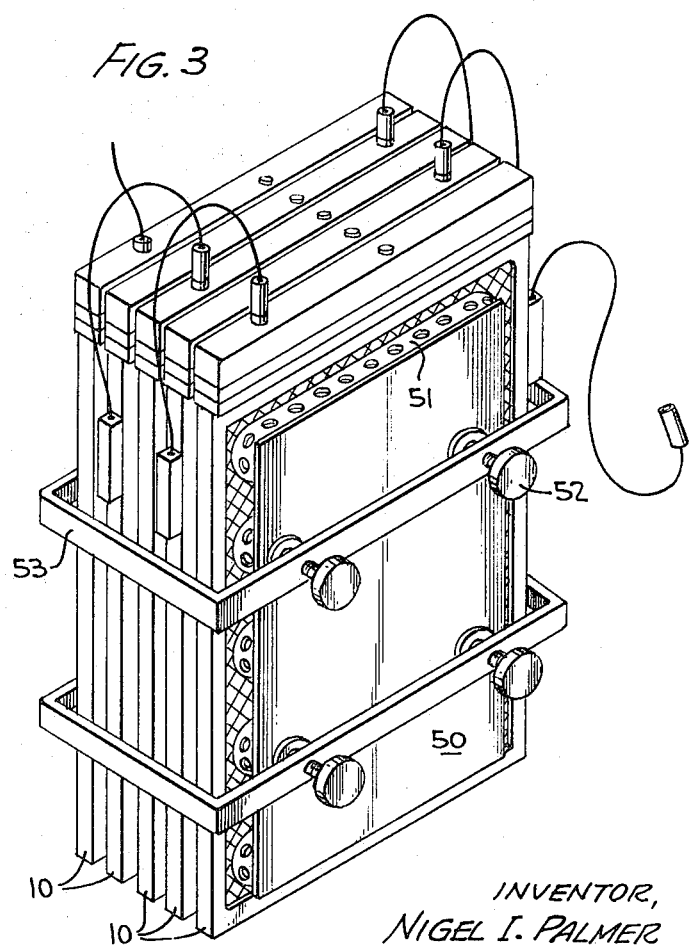

In practice, a lightweight battery assembly comprising a plurality of rechargeable plates depolarized electrochemical cells made in accordance with this invention is generally employed. Typically, the battery pack made in accordance with FIG. 3 of this invention will closely resemble primary batteries disclosed by Rosansky in U.S. Pat. No. 3,378,406. A five-cell arrangement which approximates 2 ¾×5 ½×3 ¾ inches and yields about 6 volts is shown in FIG. 3. Where desired, an enclosure may be provided with or without blower means for supplying air to the cell. The module as shown is secured between end plates 50, with suitable spacers 51 between each cell and the end plates to permit air flow to the cell. Suitable compression screws 52 and tie rods 53 can be used. In operation, a compressive force is applied to the end plates to force the cell elements into electrical engagement and to keep the cells properly aligned. The intercell spacers may be of any conventional material having an open or porous structure to permit air to pass therethrough to each of the cells in the battery. As will be readily appreciated, various modifications can be made in the design of the spacer, compression plates, and clamping means and still fulfill the essential utility of the battery. Batteries constructed and arranged in accordance with FIG. 3 can be fabricated in various sizes and shapes fitting the particular design.

Having described the invention in general terms, the following example is set forth with reference to the drawing to more particularly illustrate the invention. This example, however, is not meant to be limiting.

EXAMPLE

A rechargeable metal/air cell is constructed substantially as shown in FIG. 1. The zinc anode structure is about 80 percent porous and includes about 4 percent by weight mercury. The anode body and Visking separator are impregnated with a 30 percent by weight aqueous solution of KOH. The bi-porous unit comprises a nickel fine pore layer and a nickel mesh coarse pore layer. The air cathode comprises a 7 mil polytetrafluoroethylene supporting membrane pre-coated on the inner surface with a ½ mil uniform layer of a silver/mercury alloy in uniform admixture with polytetrafluoroethylene particles at a ratio of 10:7.

The thus assembled cell provides an open-cell voltage of 1.45 volts, a peak discharge density of 160 mA./cm.$^2$, and a peak recharge density of 50 mA./cm$^2$. Most importantly, the cell is capable of undergoing at east about 100 discharge/recharge cycles at high discharge rates. Furthermore, the energy-density value is exceptional, i.e., about 50-60 W.-hr./lb.

It should be appreciated that the present invention is not to be construed as being limited by the illustrative embodiments. For example, although the cathode unit is primarily conceived for use in regenerable metal/air cells, it can be used in other devices such as regenerative fuel cells, oxygen pumps, or generators and electrolyzers. Furthermore, although the invention is primarily conceived for use with a film cathode, it is possible to utilize the concept with more conventional electrodes such as carbon structures and the like. Additionally, although in the preferred embodiment shown a reservoir is employed, it is not essential to utilize the reservoir or the reservoir can be a part of the cathode frame. For example, where no reservoir is employed, passages can be located at the top of the composite cathode 20 to permit passage of electrolyte displaced from the coarse pore layer to pass to the anode or hydrophilic separator. These embodiments are within the ability of one skilled in the art and, accordingly, are embraced by the claims of this application.

It is claimed:

1. A metal/air or metal/oxygen depolarized cell capable of undergoing repeated discharge and recharge cycles comprising as elements
    a. a composite cathode containing a hydrophobic membrane exposed at one surface to an oxidant and in contact at said second surface with an electrocatalyst;
    b. an electrically conducting bi-porous unit having a coarse pore face and a fine pore face, said coarse pore face being in contact with said electrocatalyst of said composite cathode;
    c. a bubble barrier in contact with said fine pore face of said bi-porous unit;
    d. a consumable metal anode in electrolyte communication with said composite cathode, bi-porous unit, and bubble barrier;
    e. means for evacuating electrolyte from said coarse pore face of said bi-porous unit; and
    f. means for withdrawing or supplying electrical energy to said cell;

said elements being constructed and arranged whereby electrolyte is in continuous contact with elements (a), (b), (c), and (d) when electricity is being withdrawn from said cell and whereby when electrical energy is supplied to said cell, electrolyte is evacuated through said evacuation means from said coarse pore face of said bi-porous unit by gases formed at said fine pore layer thereby removing said electrocatalyst from electrolyte contact.

2. The cell of claim 1 wherein the bi-porous unit is an integral structure.

3. The cell of claim 1 wherein the coarse pore face and fine pore face are separate and distinct layers.

4. The cell of claim 3 wherein the coarse pore layer is a mesh.

5. The cell of claim 3 wherein the coarse pore layer is of a nonconductive material and the fine pore layer is of a conductive material, the fine pore layer and catalyst layer being in electrical contact at their peripheries.

6. The cell of claim 3 wherein the fine pore layer of said bi-porous unit has a lower oxygen over-potential than said catalyst layer.

7. The cell of claim 6 wherein said anode is a metal taken from the group consisting of zinc, cadmium, lead, iron, and mixtures thereof.

8. The cell of claim 7 in which the anode is porous zinc having from 40 percent to 85 percent porosity.

9. The cell of claim 1 wherein the bubble barrier is integral with the anode.

10. The cell of claim 1 wherein the bubble barrier is integral with said cathode.

11. The cell of claim 1 wherein the hydrophobic membrane is polytetrafluoroethylene.

12. The cell of claim 11 wherein said electrocatalyst is admixed with a hydrophobic binder.

13. The cell of claim 12 wherein said hydrophobic binder is polytetrafluoroethylene.

* * * * *